Figure 1:
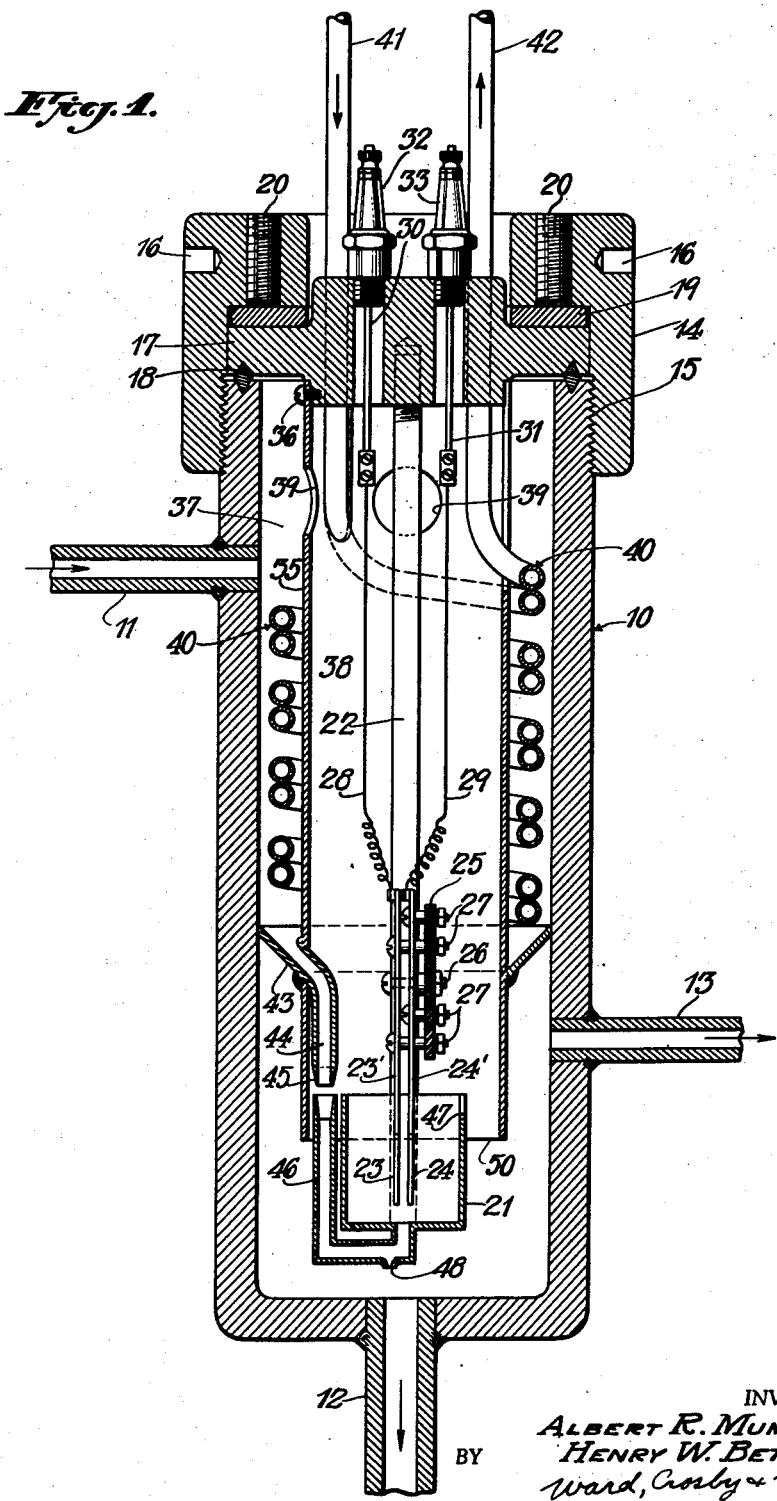

Dec. 1, 1942. A. R. MUMFORD ET AL 2,303,572
METHOD AND APPARATUS FOR DETERMINING ELECTRICAL
CONDUCTIVITY OF HEATED FLUID PRESSURE MEDIUMS
Filed June 26, 1941 2 Sheets-Sheet 1

INVENTORS
ALBERT R. MUMFORD.
HENRY W. BETZLER.
BY Ward, Crosby & Neal
ATTORNEYS

Dec. 1, 1942.   A. R. MUMFORD ET AL   2,303,572
METHOD AND APPARATUS FOR DETERMINING ELECTRICAL
CONDUCTIVITY OF HEATED FLUID PRESSURE MEDIUMS
Filed June 26, 1941   2 Sheets-Sheet 2
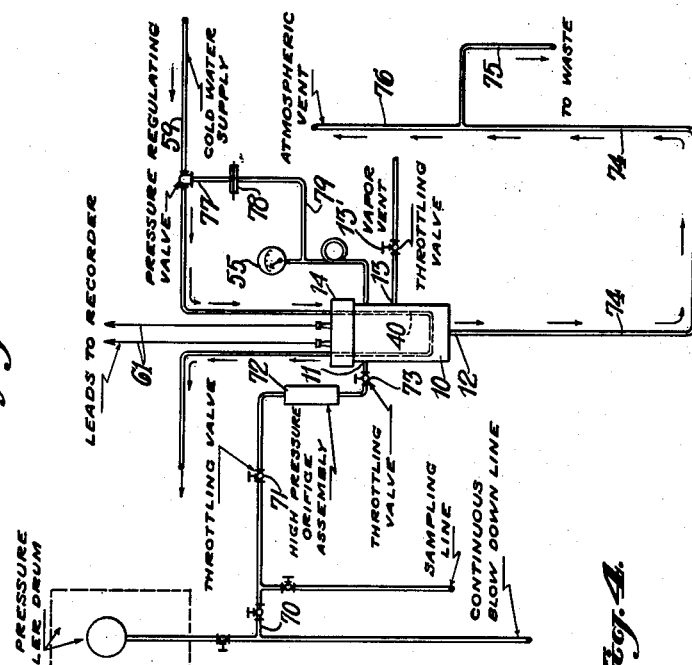
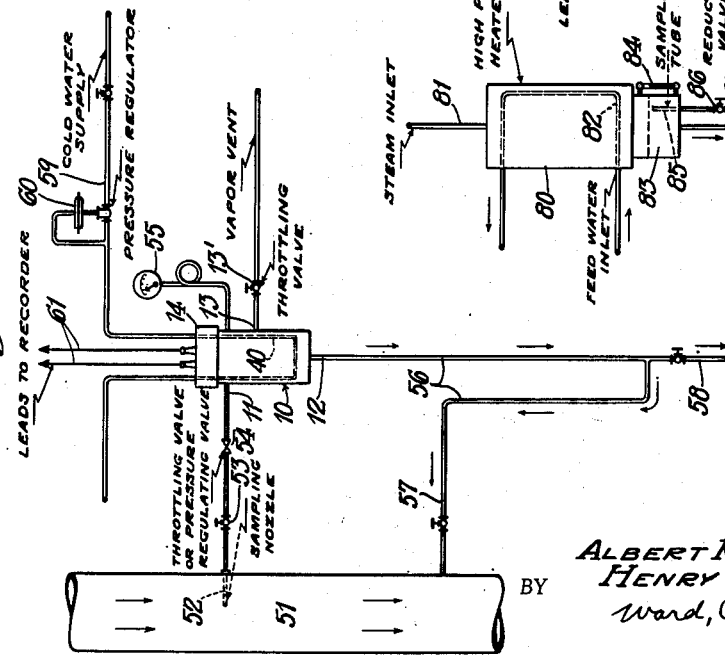
INVENTORS
ALBERT R. MUMFORD.
HENRY W. BETZLER.
BY Ward, Crosby & Neal
ATTORNEYS Patented Dec. 1, 1942

2,303,572

UNITED STATES PATENT OFFICE 2,303,572

METHOD AND APPARATUS FOR DETERMINING ELECTRICAL CONDUCTIVITY OF HEATED FLUID PRESSURE MEDIUMS

Albert R. Mumford, Bogota, N. J., and Henry W. Betzler, New York, N. Y., assignors to Consolidated Edison Company of New York, Inc., New York, N. Y., a corporation of New York Application June 26, 1941, Serial No. 399,814

7 Claims. (Cl. 175—183)

This invention relates to methods and apparatus for testing heated fluid pressure mediums such as steam, condensates thereof, boiler waters, or the like to determine the solids contents, or to indicate when the solids content becomes excessive.

This invention involves various modified forms of, and improvements upon, the methods and apparatus disclosed in the patent to Albert R. Mumford, No. 2,243,436, granted May 27, 1941, and reference to which is hereby made. The invention of said patent provides methods and apparatus for measuring the electrical conductivity of the fluid medium to thereby determine the solids content, and in such a manner as to avoid the previously exceedingly troublesome effects of the presence of soluble gas normally contained in such mediums in sufficient amounts to alter the electrical conductivity of the liquid. That is, according to said invention the electrical conductivity is measured under temperature and pressure conditions insuring coexistence in substantial amounts of the liquid and vapor phases of the medium in contact, and while the partial pressure of the gas, as mixed with the vapor, is so small as compared with the relatively great partial pressure of the vapor, that the liquid is caused to be free of any dissolved gas sufficient to materially affect its conductivity. The present invention involves improved, simplified and more durable forms of apparatus adapted for carrying out such methods and also improved arrangements of such apparatus and methods of control, such that the equipment is adaptable for a wider variety of operating conditions.

Various further and more specific objects, features and advantages will appear from the detailed description given below taken in connection with the accompanying drawings which form a part of this specification and illustrate merely by way of example preferred forms of the apparatus of the invention. The invention consists in such novel features, arrangements and combinations of parts as may be shown and described in connection with the apparatus herein disclosed, and also such novel methods and combinations of method steps as are disclosed and described herein.

In the drawings,

Fig. 1 is a vertical sectional view showing, in accordance with this invention, one form of the improved arrangement of the conductivity measuring cell and its enclosing high pressure chamber; and Figs. 2, 3 and 4 are diagrams illustrating the manner in which devices such as of Fig. 1 may be arranged and connected for testing the conductivity of condensate samples formed from high pressure steam, for testing the conductivity of boiler waters, and the conductivity of condensate from high pressure heaters, respectively.

Referring now to Fig. 1, the device there shown may comprise a high pressure chamber 10 having an inlet 11 for the hot fluid pressure medium, and outlets 12 and 13 respectively for the discharge of the water and vapor phases of such medium. The chamber 10 and such parts thereof as may come into contact with the medium being tested are preferably formed of metal such as so-called stainless steel which will be free of corrosion or other interaction with the medium. This chamber is preferably provided with a removable cover or cap portion 14 having threaded engagement as at 15 with the top of the chamber. This cap may be suitably formed as with holes 16 for engagement with a wrench. A removable head piece 17 may be received within the cap portion and this piece may serve to carry or suspend within the chamber all of the internal operating parts of the device, so that when the cap and head piece are removed, such parts may be all readily inspected, cleaned or repaired, and replaced as an assembled unit.

The lower peripheral edges of the head piece 17 and the upper edge of the chamber 10 may be suitably grooved annularly to receive a suitable known form of high pressure ring gasket as at 18. The upper peripheral surface of the head piece 17 is adapted to be engaged by the annular thrust ring 19 under the pressure of a plurality of socket head screws as at 20. This arrangement of the cap portion 14 and the head piece 17 permits the threaded portions 15 to be first screwed into engagement and then the head piece may be pressed down into tight engagement around the ring gasket by successively tightening the various socket head screws against the thrust ring 19 to insure a tight fit capable of withstanding high pressures in the cylinder 10. It will ordinarily be impossible to unthread the cap portion by applying wrench means thereto, yet upon successively loosening the various screws 20, the pressure between the head piece 17 and the gasket will be sufficiently relieved so that thereupon the cap portion may readily be unscrewed by applying wrench means thereto.

This construction of the head piece and cap avoids the necessity of any massive flanged type bolted joint which would otherwise be required for the high pressures, and further avoids the use of any bolts under tension.

The electrolytic cell for measuring the conductivity of the liquid phase of the fluid medium to be tested, may comprise a cup 21 suspended by one or more rods as at 22 from the head piece 17. Also a pair of electrodes as at 23, 24 carried on suitable electrode supports 23', 24', may be supported from the rod or rods 22. That is, a plate of suitable insulating material as at 25 secured by screws as at 26 to the rod or rods 22, may also be attached as by screws 27 to the electrode supports 23', 24', to thereby suspend the electrodes 23, 24 in their desired spaced positions in the cup 21. Flexible electrical connections as at 28, 29 may be suitably attached as shown to the upper ends of electrode supports 23', 24' to connect the latter with rigid electrical terminals as at 30, 31, the latter extending up through members 32, 33 which provide connecting terminals at the exterior of the chamber. The members 32, 33 may be constructed substantially in the form of spark plugs as used for internal combustion engines, thereby serving as insulating means capable of withstanding the high pressures in the chamber and for conducting the current from the electrodes to the exterior of the device without leakage. Any further necessary details as to the proper construction and use of the electrodes may be had by reference to the above mentioned patent.

A tubular member as at 35 may be secured at its upper end by screws as at 36 to the under side of the head piece 17, so as to extend down into the chamber and to divide the chamber into an outer annular condensing space 37, and an inner vapor space 38. These spaces may be more or less brought into communication with each other as by apertures 39 formed preferably in the upper portions of the walls of the member 35.

For withdrawing heat from the condensing space 37 a coiled conduit for conducting a fluid cooling medium may be provided as at 40. This coil may as shown be wound with a plurality of spaced turns and then doubled back upon itself with another winding in the intervening spaces so that both the inlet and outlet ends 41, 42 will be at the top of the device. These ends as shown may be sealed through the head piece 17 which will serve to support and suspend the cooling coil in its desired position between the inner walls of the chamber 10 and the outer walls of the tubular partition member 35.

Portions of the fluid medium to be tested upon entering through the inlet 11, will pass down between these walls and the cooling coil will provide cold barrier means upon the surfaces of which portions of the vapor will condense (if the entering medium is in its vapor phase). The accumulated drops will fall upon an annular inclined sheet metal barrier member 43. The condensate as collected in the member 43 may be conducted as by a pipe 44 sealed through an opening in the wall of member 35 and discharging at its lower end 45 into a conduit 46. The latter conduit in turn communicates with the space within the lower portion of the cup 21, preferably for example at a central point equi-distant from the two electrodes 23, 24. Thus the cup 21 will be normally filled to immerse the electrodes, and most of the condensate supply, after passing up around the electrodes, will be discharged at an overflow weir 47 formed at the lip of the cup. The liquid as thus discharged from the cup will fall to the bottom of the chamber 10 and thence pass out through outlet pipe 12.

Preferably at its lowest point the conduit 46 may be formed with a small drain hole as at 48 which will serve to drain the cup and conduit 46 when the supply of fluid medium being tested is shut off. Also the drain hole 48 will serve the further important function of allowing sediment which otherwise might accumulate in the cup or conduit 46 and interfere with the fluid conductivity readings, to be gradually drained away during operation of the apparatus and without permitting any troublesome amount of such sediment to accumulate.

The portion of the entering vapor which is not condensed may pass through the openings 39 into the space 38 and thereby maintain a quantity of the vapor phase of the medium in contact with the liquid phase within the cup 21. This vapor may pass out from the lower end 50 of the tubular member 35 and thence out through the vapor outlet 13.

With the construction disclosed in the above mentioned Mumford patent, the step of condensing a vapor in contact with the liquid phase was performed in a first cylinder, and the resulting vapor and liquid flowed into a second cylinder attached to the end of the first cylinder as by bolting or welding. In the second cylinder the concentrate flowed along one path through the electrode cup and then to a point of disposal. The vapor which flowed into the second cylinder was allowed to escape therefrom through a separate outlet. With the use of such apparatus for high pressures, however, the above described single chamber construction has been found to offer substantial advantages, since it eliminates the cost and difficulty of making a satisfactory joint between the two cylinders in said former construction. At the same time the cost of the construction is decreased and the construction is made more simple, since in effect the two cylinders of the present construction are arranged concentrically one within the other, with the consequence that only the outer cylinder has to be designed to resist the high pressure of the vapor. Thus the inner cylinder need only comprise a light weight partition as it is not required that it withstand the difference between the pressure of the vapor and that of the atmosphere. Also the device in its simple cylindrical form occupies substantially a minimum of space which is desirable from the installation standpoint. The consequent savings in material are substantial since the chamber walls have to be made of expensive material which will be inert in the presence of the medium being tested, to avoid modifying the highly accurate electrical conductivity measurements to be made.

Also with the construction of the above mentioned patent, the cooling medium flowed through a jacket formed on the outside of the condensing chamber, and a contact surface was provided by metal balls partially filling the chamber. Such an arrangement while generally satisfactory, necessitates removal of the balls from time to time for examination of the surfaces. On the other hand, with the above described improved construction, the use of such balls is avoided, again reducing the amount of non-corrosive material required, and a coil of water cooling tubing is substituted within the single chamber itself. And it will be apparent that this coil is installed in such a manner that it may be removed with the removable head piece of the apparatus, and accordingly readily examined at the same time that the other surfaces and parts of the device are being examined and cleaned. The operating parts may not only be inserted or removed as an assembled unit, but it will be further apparent that the assembly may be inserted longitudinally of the main chamber in any angular position in respect thereto, and without the necessity of turning the assembly or adjusting it to any particular angular position during its insertion. The present construction is also such that the bottom end of the main chamber or cylinder need not be made removable but as shown may be formed integrally with the chamber walls.

The arrangement of the present invention is of further advantage in that if there is any lack of uniformity in the temperature of the vapor in the electrode chamber due to the admission of super-heated vapor, the highest vapor temperature will be at the top of the device and therefore tend to keep the electrical connections within the top in a dry condition, thus preventing any possibility of leakage of current along wet surfaces within the lower portions of the plug constructions 32, 33.

The manner in which devices such as of Fig. 1 may be installed and connected for use in determining the conductivity of high pressure steam, is illustrated in Fig. 2 wherein a high pressure steam main is indicated at 51. A suitable known form of sampling nozzle is indicated at 52 connected through a shut-off valve 53 and a throttling or pressure regulating valve 54 to the inlet 11 of the chamber 10. Where the pressure of the steam supply does not vary materially, the valve 54 may comprise a simple throttling valve so adjusted that the vapor or steam within the chamber 10 will be free of superheat, but yet at a pressure substantially the same as that in the steam line 51. The pressure may be indicated as by pressure gauge 55 connected to the chamber 10. In such cases the condensate from outlet 12 may drain through a water seal 56, in the form of a U-tube formed of the condensate piping, thence through connection 57 and a shut-off valve back into the steam line. However, when the steam line pressure varies, the valve 54 should take the form of a pressure regulating valve, and whereby a constant high pressure will be maintained in the chamber 10. In this case the condensate from the outlet 12 may be drained through a pipe 58 having a shut-off valve therein, to any desired point of low pressure and the connection 57 may be shut off. Under these conditions the condensate of course cannot be returned directly back into the steam line.

As shown in Fig. 2, the cooling coil may be supplied with a stream of cold water introduced from a pipe 59, thence through a pressure regulating valve 60 to the inlet of coil 40. The pressure regulating valve will thus supply amounts of the cooling fluid to maintain the conditions substantially constant despite possible variations in the pressure of the cold water supply.

As indicated in Fig. 2, lead wires as at 61 may extend from the electrical terminals of the device to suitable known electrical equipment for measuring, and recording if desired, the electrical conductivity of the condensate within which the electrodes of the device are immersed.

The vapor outlet 13 as shown may be connected through a throttling valve 13' whereby if desired the portion of the medium which is vented as vapor may be adjusted to have a predetermined relationship to the proportion of the medium which is discharged as condensate through the outlet 12.

The principles of operation of the equipment of Fig. 2 and the methods according to which the same may be operated to avoid any difficulties due to the presence of soluble gases in the steam supply will now be fully apparent from the above description taken in connection with the disclosures of the above mentioned Patent No. 2,243,436. That is, the temperature and pressure conditions in the chamber 10 may readily be made such that the partial pressure of such gas is so small as compared with the relatively great partial pressure of the vapor upon the condensate in the cell, that the condensate is thereby made free of any dissolved gas sufficient to materially affect its conductivity. And these pressure conditions may be maintained constant with a proper selected adjustment of the proportion of vapor and liquid discharged from the device, by regulating the stream of cooling fluid to condense a predetermined portion of the introduced steam.

Fig. 3 illustrates how the apparatus such as of Fig. 1 may be arranged with other equipment for determining the conductivity of boiler waters. For example, a part of the water from a continuous blow-down line connected to a high pressure boiler drum, may be diverted through pipe 70, having a shut-off valve therein, then through a throttling valve if desired at 71, a high pressure orifice assembly 72, another throttling valve as at 73 if desired, and thence into the inlet 11 of the chamber 10. This high pressure water supply is thus reduced in pressure mainly by the high pressure orifice assembly and discharged into the chamber 10 as a mixture of flashed vapor and liquid. The flashed vapor is vented from the chamber 10 as in the case of Fig. 2 and the liquid discharged from the electrode cup is passed out through outlet 12, thence through a water seal 74, to a waste pipe 75, having if desired an atmospheric vent pipe 76. With this arrangement the cooling water is preferably controlled so that enough cooling water flows through the coil 40 to maintain the pressure in the chamber 10 at the desired high value, yet low enough to cause flashing of a desired amount into vapor. In this case a regulating valve 77 is shown having its pressure control diaphragm 78 subjected to the pressure in the chamber 10 by a connection 79. Thus the regulating valve 77 may be used to regulate the stream of cooling fluid by and in accordance with the pressure in the chamber 10. Hence such pressure may be readily kept at the desired constant value as indicted by gauge 55.

Any further necessary details of construction and operation of the equipment of Fig. 3 will also be now apparent from the disclosures of the above mentioned patent.

Fig. 4 illustrates how the apparatus may be installed for measuring the conductivity of condensate from a high pressure heater such as at 80. For the heater 80 a steam inlet is indicated at 81 and a feed water heating coil is indicated at 82. Condensate from the heater may accumulate at the bottom thereof as at 83, to be indicated as by a gauge 84.

A suitable known type of sampling tube as at 85 may be inserted in this condensate and connected as through a shut-off valve 86, throttling valve 87 and reducing valve 88 to inlet 11 and the chamber 10. In this case the pressure reduction is not as great as with the use of the equipment for testing boiler water as in Fig. 3, and accordingly the reducing valve 88 will ordinarily be sufficient to provide for the necessary flashing in chamber 10. Furthermore, due to the lower pressure conditions, it will ordinarily be unnecessary in this case to provide a stream of cooling fluid in the chamber 10 and accordingly same has been omitted in the diagram of Fig. 4. The construction of the remaining portions of Fig. 4 will be apparent from the description of the corresponding parts in the figures above described and features of operation of this equipment not otherwise described above will be apparent from the above mentioned patent.

What is claimed as new and desired to be secured by Letters Patent is:

1. A method of determining the solids content of a supply of heated fluid pressure medium, in the presence of gas normally soluble in the liquid medium in sufficient amounts to materially alter the electrical conductivity of the liquid, comprising measuring the electrical conductivity of the liquid medium under temperature and pressure conditions insuring coexistence in substantial amounts of the liquid and vapor phases of the medium in contact, and while the partial pressure of said gas is so small as compared with the relatively great partial pressure of the vapor, that the liquid is free of any dissolved gas sufficient to materially affect its conductivity, controlling said pressure conditions by a stream of cooling fluid passing in cooling relationship with the vapor, and regulating said stream by and in accordance with the pressure of said vapor.

2. Method of determining electrical conductivity of boiler water, comprising withdrawing a continuous stream of the water from the boiler, passing such stream through orifice means to reduce its pressure, discharging the stream through a chamber in the form of flashed vapor and water, measuring the conductivity of the water in such chamber, controlling the pressure in such chamber by a stream of cooling fluid passing in cooling relationship with the chamber, and regulating said latter stream by and in accordance with the pressure in the chamber.

3. Apparatus for determining the solids content of a heated fluid medium under pressure, including a pressure chamber, an inlet for introducing the medium therein, outlet means for discharging the medium in its liquid and vapor phases, a conduit for carrying a stream of cooling fluid into cooling relationship with said chamber to thereby maintain temperature and pressure conditions insuring coexistence of the liquid and vapor phases of the medium in the chamber, a cell for measuring the electrical conductivity of such liquid in the chamber, and a regulator for said stream controlled by the pressure in said chamber.

4. Apparatus for measuring the solids content of a heated fluid pressure medium, comprising a chamber, means for introducing the heated medium therein under substantial pressure, means for discharging the medium therefrom in its vapor and liquid phases, in amounts of each, bearing a predetermined or measured relation, means for measuring the electrical conductivity of the liquid medium in the chamber, means for passing a stream of cooling fluid in cooling relation to the chamber, and a regulator for controlling said stream by and in accordance with the pressure in the chamber.

5. Apparatus for determining the solids content of a heated fluid pressure medium, including a pressure chamber through which the medium passes and containing a cell for measuring the electrical conductivity of the medium, a conduit for carrying a stream of cooling fluid into cooling relationship with said chamber, and a regulator for said stream controlled by the pressure in said chamber.

6. Apparatus for measuring the electrical conductivity of a heated fluid pressure medium, comprising a pressure chamber with inlet and outlet connections for the medium, said chamber including a removable cover portion, a tubular member depending from the mid-portion of the cover and dividing the chamber into a vapor space within said member and an outer condensing space surrounding the same, a cooling fluid conduit coil in said outer space and depending from the cover, an electrolytic cell at the lower end of said tubular member and suspended from the cover, and means for directing condensate formed on said coil into such cell.

7. Apparatus for measuring the electrical conductivity of a heated fluid pressure medium, comprising a pressure chamber with inlet and outlet connections for the medium, an electrolytic cell mounted within the lower portion of said chamber, electrode terminals for the cell depending from the top of the chamber, cooling fluid conduit means within the chamber at an elevation higher than the cell, and means for conducting condensate from the region of such cooling means into the bottom of said cell, said latter means being formed at substantially its lowest point with a drip opening for the discharge of sediment from such condensate before its entry into the cell.

ALBERT R. MUMFORD.
HENRY W. BETZLER.